United States Patent Office 3,459,777
Patented Aug. 5, 1969

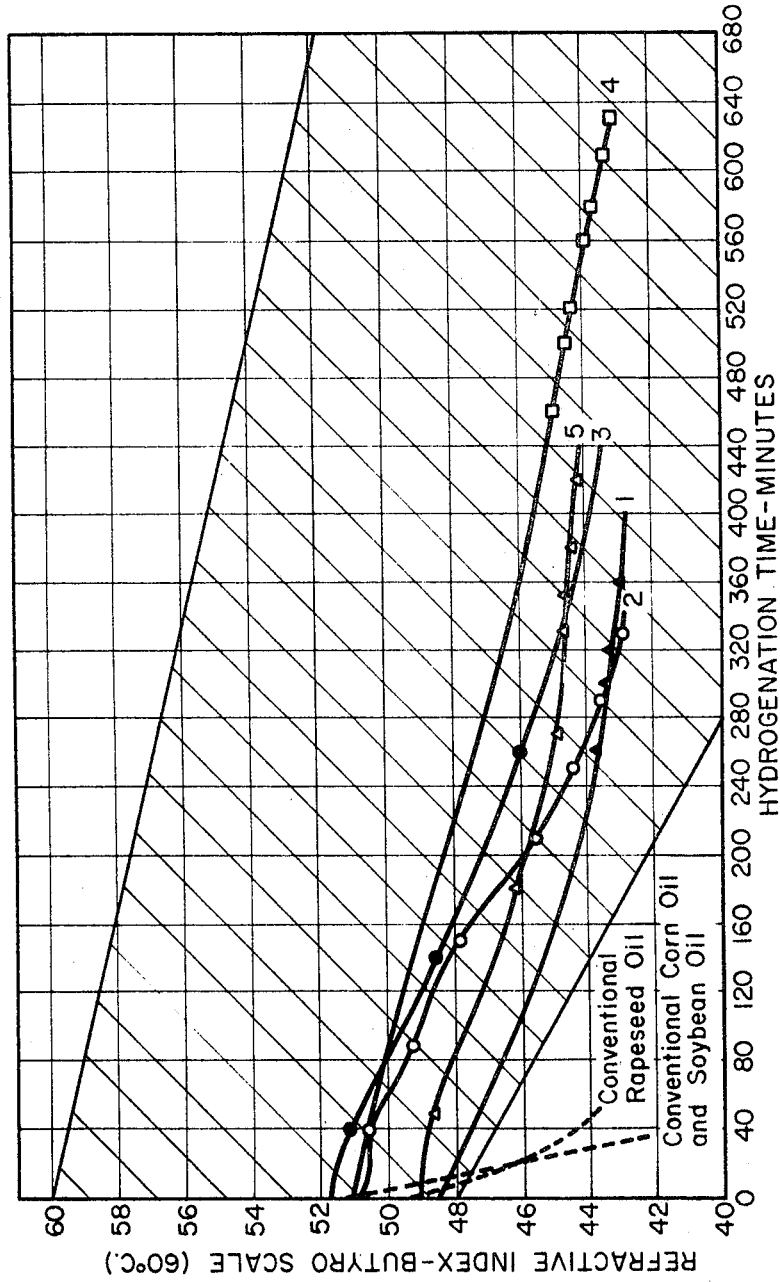

3,459,777
CATALYTIC HYDROGENATION OF OILS FOR EDIBLE PRODUCTS
Paul Seiden, Cincinnati, Ohio, assignor to The Procter & Gamble Company, Cincinnati, Ohio, a corporation of Ohio
Filed Mar. 13, 1967, Ser. No. 622,821
Int. Cl. C11c *3/12*
U.S. Cl. 260—409                                                5 Claims

ABSTRACT OF THE DISCLOSURE

In a process for catalytically hydrogenating vegetable oils and marine oils to an iodine value greater than 60, the steps of adding catalyst at the beginning of the reaction in an amount sufficient only to start the hydrogenation and subsequently incrementally adding catalyst, at a minimum prescribed frequency designed to cause the reaction to follow a predetermined, substantially straight Refractive Index/Time curve.

---

This invention relates to the hydrogenation of oils and more particularly to partial and selective hydrogenation of vegetable oils having fatty acid chains comprising 14 or more carbon atoms and of marine oils whereby to provide hydrogenated oils having narrow melting ranges and which have particular utility in connection with the formulation of margarines, ice cream coating fats, spray-on oils, biscuit filling fats, hard butters, coffee whiteners, whipped toppings and in other similar applications in which quick melting and improved eating qualities of the product are required.

Such products must have characteristics at various temperatures which make them appealing to the consumer, convenient to use, easy to store, resistant to deterioration and the like. These physical characteristics are to a great extent dependent on the type of fatty material of which the product is comprised and more particularly on the percentages of the fatty matter which exist in the solid state at the various temperatures normally encountered during the storage, use and consumption of the product.

A conventional margarine product, for example, should melt readily in the mouth to avoid a sensation of waxiness or stickiness and to have a satisfactory flavor. This means there should be little or no fatty material in the solid state at or near body temperatures. On the other hand, at temperatures of use it must be capable of being spread and this requires that some portion of the fatty material be in the solid state at the temperature, but not so much that the margarine is hard and difficult to spread and not so little that the margarine will slump or lose its shape. In addition, the margarine should have good stability to permit storage of the product in the refrigerator or at room temperature. In special cases, margarines are desirably easily spreadable at refrigerator temperature. One problem associated with some margarines is that of "oil-off," i.e., the seepage of liquid oil from the product when heated above about 70° F., which, if excessive, can permeate the parchment wrap and soil the wrap and carton and case as well. Besides making the package unsightly and oily to the touch, the oil is more susceptible to rancidity because of the greater exposure of the oil to the air. Further, since margarine contains an aqueous phase, bacterial or mold contamination can also occur. For these reasons, it is desirable for the solid content of the fatty material comprising the margarine to decrease slowly when the temperature thereof increases from about 40° F. to about 70° F. and rapidly decrease thereafter as the temperature is raised until at about 92° F. very little or no solids are present.

Similarly, the fat component of ice cream coatings should contain a high proportion, i.e., preferably about 40% or more, solids at about 50° F. which should drop rapidly to a low value, e.g., about 22% or below, at 70° F. and to little or none at about 80° F. The solids at 32° F. should be greater than about 45%.

The other products mentioned above also require fats in which the higher melting portions have relatively narrow melting ranges. The requisites in this connection are obvious to those skilled in the art and therefore not described.

The solid content referred to hereinabove is expressed at different temperatures, in terms of a "Solids Contents Index" (SCI) which is measured by what is essentially the test described in the Journal of the American Oil Chemists' Society, March 1954, vol. XXXI, pp. 98–103. The test involves a dilatometric measurement of the amount by which a fat expands when heated from a specific temperature to complete melting. Since this expansion is due to both a volume increase when solids change to liquids without a temperature change and a volume increase due to thermal expansion without change in phase from solid to liquid, allowance is made for the thermal expansion so that the change in volume gives a measure of the amount of solid phase present at the temperature of measurement. The test has been modified so that readings are taken after 30 minutes at the temperature of measurement.

SCI data for an oil are usually presented in a graph form wherein the abscissa is Temperature and the ordinant is SCI. It is readily apparent that for products such as those mentioned above, the curve plotted on the graph should be "bent," i.e., should have a steep slope at the upper temperature portion thereof and a shallow slope in the central temperature portion.

Conventional hydrogenation techniques normally will not produce a product which has a narrow melting range or high and controlled levels of trans acids (e.g., trans-isomers of octadecenoic and octadecadienoic acids). Trans acids largely contribute to increased levels of intermediate melting triglycerides which are desirable for edible products of the type described above. With conventional hydrogenation techniques an equilibrium is ultimately reached in the final stages in which the monoethanoid acids comprise approximately two-thirds trans-isomers and one-third cis-isomers. Thus, the maximum trans acid content obtainable even under selective conditions is in the order of about 50% to 55% of the total fatty acids present (about 67% based on the total number of double bonds). This level of trans acid content is not sufficient to permit the hydrogenated oil to have the narrow melting range required for high quality edible products of the type described.

Another problem associated with conventional hydrogenation techniques is concerned with controlling the process whereby uniform product results. This problem arises because of variations in the oils being processed and in the activity of the catalyst used. For example, different lots of oils of a specific type, such as soybean oil or rapeseed oil, for example, can contain varying catalyst poison levels or differ from one another due to processing variations, geographical source and storage conditions. Likewise, the activity of the catalyst can vary since the same can be fresh or partially spent. Due to these variations the hydrogenated product of identical hydrogenation processes and of oils of the same type will differ slightly from one another in important characteristics such as SCI and iodine value (IV).

It is an object of the present invention to obviate the above problems.

It is another object of this invention to provide a method for partially and selectively catalytically hydrogenating marine oils and vegetable oils having fatty acid chains comprising 14 or more carbon atoms to result in hydrogenated oils which are substantially higher in trans acid content than could be achieved with conventional hydrogenation (e.g., up to about 80% to 90% based on the total number of double bonds), have SCI characteristics well adapted for use in edible products requiring quick melting and are substantially consistent in properties regardless of minor variations in the starting material and catalyst.

It is a further object of the present invention, to provide a fatty material for an ice cream coating having a minor proportion of coconut oil and a major proportion of an oil partially hydrogenated in accordance with the subject process, which material has an SCI spread between about 50° F. to about 70° F. which is greater than that of either constituent.

In accordance with one aspect of the present invention there is provided a process of catalytically hydrogenating vegetable and marine oils at temperatures in the range of from about 180° C. to about 240° C. at pressures in the range of from about 0 p.s.i.g. to about 100 p.s.i.g., preferably from about 0 p.s.i.g. to about 20 p.s.i.g. The catalyst is added at the beginning of the hydrogenation reaction in an amount sufficient only to start the reaction Subsequently, incremental additions of catalyst are made, the additions being not less than 2 in number for each 6.5 unit decrease in Refractive Index, Butyro Scale, at a frequency such that the hydrogenation reaction follows a predetermined substantially straight Refractive Index/Time curve falling within the limits of the shaded portion of the attached graph and having a slope such that the average reduction of Refractive Index is not greater than 1.3 nor less than 0.15 unit per 20 minutes of hydrogenation. The reaction is terminated before the IV of the partially hydrogenated oil decreases to 60.

While the specification concludes with claims particularly pointing out and distinctly claiming the subject matter which is regarded as the present invention, it is believed that the invention will be better understood by reference to the following description taken in connection with the accompanying drawing in which there is illustrated a graph of Refractive Index vs. Hydrogenation Time showing by shading the limits within which the present hydrogenation process proceeds.

It is generally known that the process factors favoring selectively of hydrogenation, i.e., the hydrogenation of linolenic acid before linoleic acid, before oleic acid, are higher temperature, lower pressure of hydrogen, use of partially deactivated catalyst, less agitation and either higher or very low catalyst concentration. It is also generally known that the usual case is that higher selectivity is accompanied by greater trans isomer formation. A conventional selective batch hydrogenation is normally carried out in the following manner:

(1) The oil is heated to the catalyst addition temperature, about 165° C. to 175° C.

(2) The required amount of catalyst is added to the oil.

(3) The hydrogen flow is increased (up to the running rate) and the hydrogenation starts. Depending on the degree of activity of the catalyst and the level of catalyst poisons present in the oil, hydrogenation will be fast or slow. In case of fast reaction rate, the temperature will increase; for example, it will range from 165° C. to 195° C.

(4) At the required end point hydrogenation is discontinued and the oil is cooled for catalyst filtration.

Since catalyst deactivation is not instantaneous, the rate of reaction at the start of a normal selective batch hydrogenation run will be faster than near the end. The higher activity of the catalyst will result in a less selective type hydrogenation at the start than at the end of the run. Curves showing the rate of hydrogenation by conventional techniques for corn oil, rapeseed oil and soybean oil are shown by dotted lines in the drawing.

In the present process a radical departure is made from conventional processes in the manner of catalyst addition while the temperature is controlled in the range of from about 180° C. to 240° C. Instead of all catalyst being added at the commencement of the run, as in conventional practice, an initial quantity is added in an amount only sufficient to start the reaction at the temperature used. In practice, the initial quantity is chosen empirically depending on the presumed activity of the catalyst and too little, rather than too much, catalyst added to begin with since a small further addition can compensate for too small an initial quantity. In this manner the use of catalysts of varying activity with starting oils of slightly varying quality can be compensated for.

After the reaction starts, further incremental additions of catalyst are made as the hydrogenation proceeds. Each incremental catalyst addition amounts to less than the initial quantity of catalyst, preferably less than about half of the initial quantity. Such incremental additions are made in accordance with the rate of hydrogenation, at times designed to cause the hydrogenation of the oil to follow a predetermined, substantially straight Refractive Index/Time curve. The Refractive Index/Time curve can be determined empirically for each oil of interest and SCI desired at a particular temperature. In any event, each of such curves will fall within the shaded area of the appended graph of Refractive Index vs. Time and should have a slope such that the average reduction of Refractive Index is not greater than about 1.3 nor less than about 0.15 unit per 20 minutes of hydrogenation, preferably being in the range of from about 0.25 to about 1.0 unit per 20 minutes of hydrogenation. Within the shaded range the process of the present invention produces partially hydrogenated oils having trans acid content ranging up to 80% to 90% based on total double bonds. It is not necessary that the hydrogenation curve extend completely across the shaded portion nor must it lie wholly therewithin, i.e., the curves can terminate inside the shaded portion or extend beyond, so long as the process conditions are maintained within that portion.

Once having the desired Refractive Index/Time curve for a specific oil to produce a fat which is hydrogenated to a particular extent, the control of the process accordingly can be accomplished by frequent sampling and Refractive Index determination and plotting the results against time on the same graph as the predetermined curve. If the actual Refractive Index is higher than the target value of the predetermined curve at a particular time in the process, then a small amount of catalyst is added to speed up the reaction and cause the actual and the target Refractive Indices to approximate. Care should be taken, as indicated above, to add further catalyst in small quantities so as to avoid having the reaction proceed too rapidly and thereby avoid having the actual lower than the target Refractive Index, a situation which cannot be adjusted summarily by catalyst addition.

The oils to which the present process is particularly applicable are vegetable oils having fatty acid chains comprising at least 14 carbon atoms and marine oils. Exemplifying such vegetable oils are rapeseed oil, soybean oil, sunflower seed oil, corn oil, safflower seed oil, Canbra oil and mixtures thereof. Canbra is the proposed name for a new strain of plants developed from rape (*Brassica campestris* and *Brassica napus*). Marine oils are typified by sardine oil, herring oil, whale oil, menhaden oil, and mixtures thereof. Each of these oils contains polyunsaturates, i.e., fatty acids having two or more double bonds, and for this reason temperature control during the process is important. In this connection, temperatures which are too high, e.g., above about 230° C. in conventional processes result in a gradual deterioration of oil quality. The deterioration is measured by an increase in free fatty acid and by polymerization and apparently is a function of the degree of unsaturation of the oil, the time of exposure to high temperature and the temperature of exposure.

Thus, although it is desired to use high temperatures in order to make the process as selective as possible (to produce a maximum of trans acids) the temperature of reaction in the present process should be controlled to reduce the possibility of damage to the oils. It has been found that such temperature can be raised as the unsaturation, particularly polyunsaturation, is decreased. Preferably, the temperature during at least the first one-quarter of the reaction should be held in the range of from about 180° C. to about 230° C. and subsequently raised, preferably at a uniform rate to a higher temperature in the range of from about 210° C. to about 240° C., the higher temperature being maintained during at least about the final one-quarter of the hydrogenation reaction. If temperatures are not so regulated the trans acid level in the hydrogenated product produced by the above described incremental catalyst addition process will be substantially higher than with conventional techniques but in most cases will not achieve the maximum 80% to 90% level indicated.

As stated previously, the process of this invention has utility in producing partially hydrogenated oils suitable for use in edible products requiring quick melting and consistent properties; therefore, if neither requirement is of any importance, then conventional hydrogenation techniques should prove satisfactory. Similarly, the process possesses advantages only in connection with oils to be hydrogenated to IV's of more than 60, preferably not lower than 68.

The following examples are given to illustrate the process of this invention. In Examples I–V the oil was processed in batches of 140 pounds and a partially deactivated nickel catalyst material was employed, the powdered nickel metal being present in such material in amounts 5.82% by weight of the quantities of catalyst material denoted. The hydrogenation was carried out in a conventional pilot plant hydrogenation machine equipped with means to control temperature during the process. Hydrogenation proceeded at low pressures in the range of from about 0 p.s.i.g. to about 20 p.s.i.g.

EXAMPLE I

A batch of Canbra oil was hydrogenated according to the following table (see curve 1 of graph):

| Time from Start of Hydrogenation in Minutes | Refractive Index, Butyro Scale, 60° C. | Catalyst Addition in Grams | Temperature, ° C. |
|---|---|---|---|
| 0 | 48.4 | [1] 300 | Approximately 203° C. to 150 minutes. |
| 40 | 47.7 | | |
| 80 | 46.7 | | |
| 120 | 45.8 | | |
| 160 | 45 | | Increasing to 200 minutes. |
| 200 | 44.4 | | |
| 240 | 43.9 | | Approximately 240° C. to termination. |
| 260 | 43.7 | 45 | |
| 280 | 43.5 | | |
| 300 | 43.4 | 45 | |
| 320 | 43.3 | 45 | |
| 360 | 43 | 45 | |
| 400 | 42.8 | | |

[1] Initial.

The partially hydrogenated product had the following SCI characteristics as compared with Canbra oil hydrogenated by conventional techniques:

| | Product | Conventional |
|---|---|---|
| SCI at— | | |
| 50° F | 46.8 | 39.8 |
| 70° F | 23.0 | 21.2 |
| 80° F | 6.9 | 11.8 |
| 86° F | 1.0 | 6.0 |
| 92° F | 0.0 | .5 |

As is readily apparent from this comparison, the partially hydrogenated oil of this example is substantially better suited for use in preparing edible products exemplified by ice cream coatings and margarines than the product of the conventional process.

EXAMPLE II

A batch of corn oil oil was hydrogenated according to the following table (see curve 2 of graph):

| Time from Start of Hydrogenation in Minutes | Refractive Index, Butyro Scale, 60° C. | Catalyst Addition in Grams | Temperature, ° C. |
|---|---|---|---|
| 0 | 50.9 | [1] 200 | Between about 220° C. and 230° C. until 120 minutes. |
| 20 | 50.5 | | |
| 40 | 50.5 | 50 | |
| 60 | 50 | | |
| 80 | 49.5 | | |
| 90 | 49.2 | 50 | |
| 100 | 49 | | |
| 120 | 48.75 | | |
| 150 | 47.8 | 50 | Increasing. |
| 160 | 47.5 | | |
| 200 | 45.8 | | Approximately 240° C. from 200 minutes to termination. |
| 210 | 45.6 | 50 | |
| 240 | 44.6 | | |
| 270 | 43.9 | 50 | |
| 280 | 43.8 | | |
| 290 | 43.6 | 100 | |
| 320 | 43 | | |
| 330 | 43 | 100 | |
| 340 | 42.9 | | |

[1] Initial.

The partially hydrogenated product had the following SCI characteristics as compared with corn oil hydrogenated by conventional techniques:

| | Product | Conventional |
|---|---|---|
| SCI at— | | |
| 50° F | 51.1 | 45.3 |
| 70° F | 34.3 | 31.2 |
| 80° F | 22.5 | 23.3 |
| 86° F | 12.9 | 15.4 |
| 92° F | 2.1 | 5.7 |
| 98° F | 0.0 | .3 |

From the above it will be recognized that there is a substantial increase in the quantity of intermediate melting triglycerides because of an increased level of trans acids. Such partially hydrogenated oil can be used without further processing in edible products of the type mentioned above or can be fractionated to obtain an oil with SCI characteristics more specific for the product desired, in which case the yield of triglycerides of intermediate melting range will be correspondingly improved. To illustrate the utility of fractions of oils partially hydrogenated by the subject process, the partially hydrogenated oil of this example was fractionated in a mix tank equipped with cooling coils by rapidly cooling the oil to 65° F. The oil was agitated and such agitation continued for 30 minutes. Then the oil was filtered through a rotary filter and the stearine fraction collected. The stearine fraction was then melted and blended with refined and bleached corn oil (not hydrogenated), 49 parts by weight of the stearine fraction to 51 parts by weight of refined and bleached corn oil, to form a margarine oil. 80 pounds of the margarine oil was melted and heated to 110° F. in a hot water jacketed pilot plant mix tank. Then 1.65 pounds of commercial milk powder and 2 pounds of salt were mixed (slurried) in 15 pounds of water. An emulsion was prepared from the margarine oil and from the milk slurry with an addition of 0.05 pound monoglycerides from partially hydrogenated soybean oil. The margarine emulsion was chilled through a conventional Votator "A" unit assembly and a "B" unit. Votators (chillers) are well-known in the art, but a description of such apparatus may be found at pp. 921–924 of A. E. Bailey, Industrial Oil and Fat Products, 2nd ed., Interscience Publishers Inc., New York, N.Y. (1951). The extruded product was packed at approximately 40° F. and tempered as usual for 48 hours at 50° F. and tested and compared with a conventional margarine product by standard testing procedures. Spreadability at 40° F., flavor and eating qualities at 40° F. and 70° F.

were judged by a panel of experts and graded on a scale of 1 to 10, 1 being poor and 10 being excellent. Slump tests were also graded by a panel of experts on the same grading scale against standard photographs. Oil-off figures were quantitatively determined by measuring the oil exuded by a margarine sample after 24 hours at 85° F. The reported figures are the calculated percentages of lost oil.

|  | Margarine Prepared According to this Example | Convenl tiona Margarine |
|---|---|---|
| SCI at— | | |
| 50° C | 22.8 | 30.6 |
| 70° F | 15.7 | 16.0 |
| 80° F | 7.9 | 10.1 |
| 86° F | 3.5 | 6.2 |
| 92° F | 0.0 | 2.4 |
| Eating Quality at— | | |
| 40° F | 8.2 | 7.1 |
| 70° F | 8.4 | 7.4 |
| Spreadability at 40° F | 7.4 | 5 |
| Percent Oil-off | 4.2 | 2.1 |
| Aged Evaluation (7 wks. at 70° F.): | | |
| Flavor | 8.0 | 6.2 |
| Eating Quality at— | | |
| 40° F | 8.2 | 6.5 |
| 70° F | 7.7 | 6.7 |

From the SCI comparison alone, it will be seen that the margarine prepared according to this example is superior to the conventional product in almost all respects. Although the 70° F. SCI's are approximately identical the SCI of the prepared product at lower temperatures is lower than that of the conventional product and therefore the spreadability of the prepared product is superior at refrigerator temperature. Moreover, the SCI of this product at higher temperature is lower than that of the conventional product and hence the product eating qualities are enhanced. The only shortcoming of the product in contrast to the coventional margarine is a greater oil-off and this is within a range which is not objectionable. The aging tests show that the product quality is excellent and that the eating quality remains substantially constant whereas the conventional product's eating eating quality is reduced and the flavor rating is substantially lower.

EXAMPLE III

A batch or soybean oil was hydrogenated according to the following table (see curve 3 of graph):

| Time from Start of Hydrogenation in Minutes | Refractive Index, Butyro Scale, 60° C. | Catalyst Addition in Grams | Temperature, ° C. |
|---|---|---|---|
| 0 | 51.75 | [1] 135 | Approximately 180° C. |
| 40 | 51.1 | 45 | to 300 minutes. |
| 80 | 49.9 | | |
| 120 | 48.9 | | |
| 140 | 48.5 | 10 | |
| 160 | 48.05 | | |
| 200 | 47 | | |
| 240 | 46.3 | | |
| 260 | 46 | 10 | |
| 280 | 45.6 | | |
| 320 | 45 | | Increasing. |
| 360 | 44.2 | | Approximately 210° C. |
| 400 | 43.8 | | from 340 minutes |
| 440 | 43.5 | | to termination. |
| 480 | 43.4 | | |

[1] Initial.

The partially hydrogenated product had the following SCI characteristics as compared with soybean oil hydrogenated by conventional techniques:

|  | Product | Conventional |
|---|---|---|
| C I at— | | |
| 50° F | 49.8 | 38.8 |
| 70° F | 31.0 | 21.0 |
| 80° F | 19.3 | 12.3 |
| 86° F | 9.6 | 7.0 |
| 92° F | 1.8 | 1.7 |
| 98° F | 0.0 | .4 |

Note that in this comparison the 92° F. SCI's are almost identical while the 50° F. SCI of the partially hydrogenated oil of this example is 11 units higher than that of the conventional process, thus showing a much higher concentration of triglycerides having an intermediate melting range and therefore indicating superiority for use in formulating the types of edible products requiring fats of narrow melting range.

EXAMPLE IV

A batch comprising a mixture of 70° soybean oil and 30% rapeseed oil was hydrogenated according to the following table (see curve 4 of graph):

| Time from Start of Hydrogenation in Minutes | Refractive Index, Butyro Scale, 60° C. | Catalyst Addition in Grams | Temperature, ° C. |
|---|---|---|---|
| 0 | 51.0 | [1] 200 | Approximately 220° C. to 230° C. to 160 minutes. |
| 40 | 50.6 | | |
| 80 | 50 | | |
| 120 | 49.5 | | |
| 160 | 48.9 | | |
| 200 | 48.2 | | Increasing. |
| 240 | 47.7 | | Approximately 240° C. from 210 minutes to termination. |
| 280 | 47 | | |
| 320 | 46.5 | | |
| 360 | 46 | | |
| 400 | 45.6 | | |
| 440 | 45.2 | | |
| 460 | 45.1 | 50 | |
| 480 | 44.7 | | |
| 500 | 44.6 | 90 | |
| 520 | 44.3 | 90 | |
| 560 | 44 | 120 | |
| 580 | 43.7 | 100 | |
| 600 | 43.4 | | |
| 610 | 43.3 | 100 | |
| 630 | 43.1 | 120 | |
| 640 | 43 | | |

[1] Initial.

The partially hydrogenated product had the following SCI characteristics are compared with a mixture of 70% soybean oil, 30% rapeseed oil hydrogenated by conventional techniques:

|  | Product | Conventional |
|---|---|---|
| SCI at— | | |
| 50° F | 51.6 | 40.5 |
| 70° F | 34.0 | 22.1 |
| 80° F | 23.1 | 13.3 |
| 86° F | 15.1 | 7.8 |
| 92° F | 5.3 | 1.9 |
| 98° F | 0.5 | .3 |

It is observed in this comparison that in the range of temperatures of interest the SCI difference is substantially greater for the partially hydrogenated oil of this example than for the partially hydrogenated oil produced by the conventional process. To illustrate, the SCI differential in the range of greatest interest, i.e., between 70° and 92°, is 28.7 units for the oil of the subject process while that of the conventional process has a difference of only 20.2. The advantage is enhanced when the entire range is considered.

EXAMPLE V

A batch of rapeseed oil was hydrogenated according to the following table (see curve 5 of the graph):

| Time from Start of Hydrogenation in Minutes | Refractive Index, Butyro Scale, 60° C. | Catalyst Addition in Grams | Temperature, ° C. |
|---|---|---|---|
| 0 | 49 | [1] 390 | Approximately 200° C.-205° C. to 150 minutes. |
| 20 | 48.9 | | |
| 50 | 48.7 | 90 | |
| 60 | 48.5 | | |
| 100 | 47.55 | | |
| 140 | 46.7 | | |
| 180 | 46.2 | 45 | Increasing. |
| 220 | 45.4 | | Approximately 240° C. from 210 minutes to termination. |
| 260 | 45 | | |
| 270 | 45 | 45 | |
| 300 | 44.8 | | |
| 330 | 44.7 | 45 | |
| 340 | 44.7 | | |
| 350 | 44.6 | 90 | |
| 380 | 44.4 | 90 | |
| 420 | 44.3 | 90 | |
| 440 | 44.2 | | |

[1] Initial.

The partially hydrogenated product had the following characteristics as compared with rapeseed oil hydrogenated by conventional techniques:

| SCI at— | Product | Conventional |
|---|---|---|
| 50° F | 55.3 | 55.3 |
| 70° F | 38.9 | 41.0 |
| 80° F | 24.8 | 33.6 |
| 86° F | 13.7 | 25.6 |
| 92° F | 2.4 | 16.6 |
| 98° F | 0.0 | 7.9 |
| 105° F | 0.0 | 0.8 |

The same advantages previously pointed out in the other examples when contrasting the partially hydrogenated oils produced by the subject method to oil hydrogenated by conventional techniques are applicable to the comparison of this example.

Although each of the above examples relate to batch hydrogenation it will be understood by those skilled in the art that substantially similar results can be achieved by means of continuous hydrogenation techniques in which small amounts of catalyst can be continuously metered into the oil being processed, the rate of metering being regulated by controls automatically actuated by means of appropriate signals emanating from a continuous refractometer. The same technique could also be used to meter catalyst continually in the batch hydrogenation system, an infinite number of catalyst additions in this connection being ideal.

It has been found that the preferred hydrogenated oil of the subject hydrogenation method has an SCI at 70° F. of from about 35 to about 45 if fractional crystallization of the oils is not to be employed before use, otherwise an SCI at 70° F. of between 25 and 35 is preferred. The use of fractional crystallization at about room temperature (70° F. to 75° F.) is especially interesting since the solids removed (stearine) is useful in margarines and the remaining fraction (oleic) closely resemblies coconut oil in its SCI characteristics.

Oils which have been partially hydrogenated according to the subject method, particularly rapeseed oil, can be made into an excellent ice cream coating fat without fractionation. Presently coconut oil is the type of fat in general use for such product because of its rather unique melting characteristics. However, it was found that by blending the partially hydrogenated oils produced by the subject method with between about 20% to about 50%, preferably between about 20% to 30%, by weight of coconut oil, a composition having excellent characteristics for an ice cream coating fat was obtained which had a greater SCI spread between 50° F. and 70° F. than either of the constituents. This is illustrated in the following example.

EXAMPLE VI

A 15,000 pound batch of rapeseed oil was partially hydrogenated in a recirculating type batch hardening machine without mechanical agitation and using incremental additions of partially deactivated catalyst material in the amounts denoted, the powdered nickel content of the catalyst material being approximately 3%. The reaction was carried out at a pressure of about 15 p.s.i.g. and proceeded as set forth in the following table:

| Time from Start of Hydrogenation in Minutes | Refractive Index, Butyro Scale, 60° C. | Catalyst Addition in lbs. | Temperature, ° C. |
|---|---|---|---|
| 0 | 48.8 | ¹20 | Between 210° C. and and 220° C. until 60 minutes. |
| 20 | 48.2 | | |
| 40 | 47.9 | | |
| 60 | 47.6 | 16 | |
| 80 | 46.75 | | Increasing. |
| 100 | 46.2 | 14 | Approximately 230° C. from 100 minutes to termination. |
| 120 | 45.5 | | |
| 140 | 44.75 | | |
| 150 | 44.5 | | |
| 160 | 44.3 | | |

¹ Initial.

The partially hydrogenated oil had an IV of 82.3 and was formulated into an ice cream coating fat by combining it with 25% by weight of coconut oil. The improvement in SCI characteristics over each of the constituent oils is presented in tabular form as follows:

| | Coconut Oil | Rapeseed Oil | 75% Rapeseed Oil, 25% Coconut Oil |
|---|---|---|---|
| SCI at— | | | |
| 50° F | 47.5 | 43.3 | 38.6 |
| 70° F | 22.1 | 21.9 | 10.7 |
| 80° F | 0.0 | 7.2 | 2.9 |
| 86° F | 0.0 | 1.5 | .8 |
| 92° F | 0.0 | 0.0 | 0.0 |

Even more significant results can be achieved by fractionation of the hydrogenated rapeseed oil at about 75° F. and using the oleic fraction in such ice cream coating fats. In order to have desired characteristics in such a product the partially hydrogenated oil should have an SCI at 70° of from about 2 to about 26 and a 50° SCI between about 32 and 49. In addition, the 50°–70° SCI differential should range between about 20 to about 40 units.

Menhaden oil having a Refractive Index of 57.1 is processed at a rate generally paralleling the hydrogenation rate of this example within the shaded area of the attached graph and using the equipment and techniques of this example to produce a hydrogenated oil having excellent SCI characteristics. The same is done with a mixture of 50% menhaden oil and 50% rapeseed oil for similarly good results.

Oils which are partially hydrogenated in accordance with the subject method are also useful in ultra-soft margarine products which are now being sold commercially. (These are the products which are normally packaged in small tub-like containers.) The following example relates to such utility.

EXAMPLE VII

A 15,000 pound batch of soybean oil was partially hydrogenated in the equipment and with the catalyst and hydrogenation pressure described in Example VI. The partially hydrogenated oil was processed as follows:

| Time from Start of Hydrogenation in Minutes | Refractive Index, Butyro Scale, 60° C. | Catalyst Addition in Lbs. | Temperature, ° C |
|---|---|---|---|
| 0 | 50.8 | 45 | 176 |
| 20 | 49.5 | | 186 |
| 40 | 48.5 | | 193 |
| 60 | 47.6 | | 198 |
| 80 | 46.8 | | 202 |
| 100 | 46.0 | | 203 |
| 120 | 45.2 | | 205 |
| 140 | 44.6 | 13 | 206 |
| 160 | 43.8 | | 207 |
| 180 | 43.0 | | 208 |
| 190 | 42.6 | | 208 |
| 200 | 42.3 | | 209 |

The resulting oil had the following SCI values:

SCI at—
| 50 | 52.9 |
|---|---|
| 70 | 35.0 |
| 80 | 23.7 |
| 86 | 15.1 |
| 92 | 0.0 |
| 98 | 0.0 |

The partially hydrogenated oil was then fractionated according to the procedure of Example II and the stearine fraction collected. The stearine fraction was then melted and blended with a slightly hydrogenated soybean oil (IV=107), 32 parts of stearine fraction to 68% by weight of the slightly hydrogenated soybean oil, to form a margarine oil. Margarine product was then made in accordance with the proportions and procedure of Example II and similarly evaluated against a commercial ultra-soft margarine:

|  | Margarine Prepared According to this Example | Commercial Ultra-soft Margarine |
|---|---|---|
| SCI at— | | |
| 50° F | 16.1 | 13.1 |
| 70° F | 7.4 | 8.3 |
| 80° F | 2.1 | 6.3 |
| 86° F | 0.0 | 4.8 |
| 92° F | 0.0 | 2.8 |
| 98° F | 0.0 | 0.9 |
| Eating Quality at 40° F | 8.0 | 6.0 |
| Spreadability at 40° F | 9.2 | 8.7 |
| Flavor | 6.0 | 6.4 |
| Aged Evaluation (1 mo. at 70° F.): | | |
| Eating quality | 7.5 | 6.2 |
| Spreadability at 40° F | 8.5 | 8.5 |
| Flavor | 6.1 | 6.5 |

It will be seen that the margarine of this example outperformed the commercial ultra-soft margarine in virtually all tests. This is due in good part to the properties of the margarine oil and particularly to the portion thereof prepared in accordance with the subject method.

As pointed out previously, the partially hydrogenated oils processed according to the subject process do not have to be fractionated for utility in margarine products and the following example is illustrative of this point.

EXAMPLE VIII

A batch of rapeseed oil was hydrogenated by the subject method to an SCI value at 70° F. of 47.0. The oil was then melted and blended with a slightly hydrogenated soybean oil (IV=107) 25 parts by weight of the partially hydrogenated rapeseed oil to 75 parts by weight of the soybean oil, to form a margarine oil. An ultra-soft margarine product was then made in accordance with the proportions and procedure of Example II and similarly evaluated against a commercial ultra-soft margarine:

|  | Margarine Prepared According to this Example | Commercial Ultra-soft Margarine |
|---|---|---|
| SCI at— | | |
| 50° F | 14.6 | 13.1 |
| 70° F | 6.7 | 8.3 |
| 80° F | 3.3 | 6.3 |
| 86° F | 1.5 | 4.8 |
| 92° F | 0.0 | 2.8 |
| 98° F | 0.0 | 0.9 |
| Eating quality at 40° F | 7.7 | 6.0 |
| Spreadability at 40° F | 8.8 | 8.7 |
| Flavor | 7.0 | 6.4 |

Thus, it is noted that the ultra-soft product prepared according to this example was rated higher than the commercial product in each of the tests made and accordingly was judged a more desirable product.

What is claimed is:

1. In the process of catalytically hydrogenating vegetable oils having fatty acid chains having at least 14 carbon atoms and marine oils and mixtures thereof with a nickel containing catalyst at a temperature in the range of from about 180° C. to about 240° C., at pressures in the range of from about 0 p.s.i.g. to about 100 p.s.i.g., the improvement which comprises adding an initial quantity of nickel-containing catalyst to the oil at the beginning of the hydrogenation reaction in an amount sufficient only to start the reaction followed by incremental additions of catalyst to the oil undergoing the reaction, said additions each being less in quantity than the initial quantity and the number of said additions being not less than 2 for each 6.5 unit decrease in Refractive Index, Butyro Scale, at a frequency such that the hydrogenation reaction follows a substantially straight Refractive Index/Time curve falling within the shaded portion of the graph of the accompanying drawing and having a slope such that the average reduction of refractive Index is in the range of from about 0.15 to about 1.3 unit per 20 minutes of hydrogenation and terminating said reaction before the iodine value of the partially hydrogenated oil decreases to 60.

2. The process of claim 1 in which said average reduction of Refractive Index falls within the range of from about 0.25 to about 1.0 unit per 20 minutes of hydrogenation.

3. The process of claim 1 in which said temperature falls within the range of from about 180° C. to about 230° C. at the beginning and for at least about the first one-quarter of said hydrogenation reaction and at a higher temperature within the range of from about 210° C. to about 240° C. during at least about the last one-quarter of said hydrogenation reaction.

4. The process of claim 3 in which said incremental additions of catalyst are in quantities less than about half of the amount required to start the hydrogenation reaction.

5. The process of claim 3 in which incremental additions of catalyst are fed into the reaction on a continuous basis.

References Cited

UNITED STATES PATENTS

| 2,308,848 | 1/1943 | Young et al. | 260—409 |
| 2,520,422 | 8/1950 | Mills et al. | 260—409 |
| 2,520,423 | 8/1950 | Mills et al. | 260—409 |
| 2,520,425 | 8/1950 | Mills | 260—409 |

FOREIGN PATENTS 6,605,929  11/1966  Netherlands.

BERNARD HELFIN, Primary Examiner

HOWARD T. MARS, Assistant Examiner

U.S. Cl. X.R.

99—136

PO-1050
(5/69)

UNITED STATES PATENT OFFICE
CERTIFICATE OF CORRECTION

Patent No. 3,459,777  Dated  August 5, 1969

Inventor(s) Paul Seiden

It is certified that error appears in the above-identified patent and that said Letters Patent are hereby corrected as shown below:

Column 7, line 67, "CI" should read -- SCI --. Column 10, line 48, "45" should read -- (initial - 45) --; line 66 "92-----------0.0" should read -- 92-----------4.6 --.

SIGNED AND
SEALED

OCT 28 1969

(SEAL)
Attest:

Edward M. Fletcher, Jr.
Attesting Officer

WILLIAM E. SCHUYLER, JR.
Commissioner of Patents